| United States Patent [19] | [11] Patent Number: 4,780,447 |
| Kim et al. | [45] Date of Patent: Oct. 25, 1988 |

[54] CATALYSTS FOR CONTROLLING AUTO EXHAUST EMISSIONS INCLUDING HYDROCARBON, CARBON MONOXIDE, NITROGEN OXIDES AND HYDROGEN SULFIDE AND METHOD OF MAKING THE CATALYSTS

[75] Inventors: Gwan Kim, Olney; Michael V. Ernest; Stanislaw Plecha, both of Baltimore, all of Md.

[73] Assignee: W. R. Grace & Co.-Conn., New York, N.Y.

[21] Appl. No.: 72,382

[22] Filed: Jul. 10, 1987

[51] Int. Cl.$^4$ .................. B01J 23/10; B01J 23/58; B01J 23/89

[52] U.S. Cl. .................. 502/243; 502/303; 502/304; 423/213.5

[58] Field of Search .................. 502/243, 303, 304; 423/213.5

[56] References Cited

U.S. PATENT DOCUMENTS

| 4,171,287 | 10/1979 | Keith | 502/327 X |
| 4,591,580 | 5/1986 | Kim et al. | 502/304 X |
| 4,738,947 | 4/1988 | Wan et al. | 502/304 |

*Primary Examiner*—W. J. Shine
*Attorney, Agent, or Firm*—Edward J. Cabic

[57] ABSTRACT

A catalyst, which is capable of controlling not only HC, CO and NOx, but also $H_2S$ emission from the tail pipe of catalytic converter-equipped automobiles, is made of noble metals promoted with ceria-rich rare earth oxides, preferably doubly promoted along with alkali metal oxides, and oxides of nickel and/or iron as an $H_2S$ gettering ingredient. The oxides of nickel and/or iron are present in an $H_2S$ gettering effective amount and in an amount up to 10 wt %. The alumina support can have additionally from 0 to 20% $SiO_2$ present.

34 Claims, 1 Drawing Sheet

The Figure
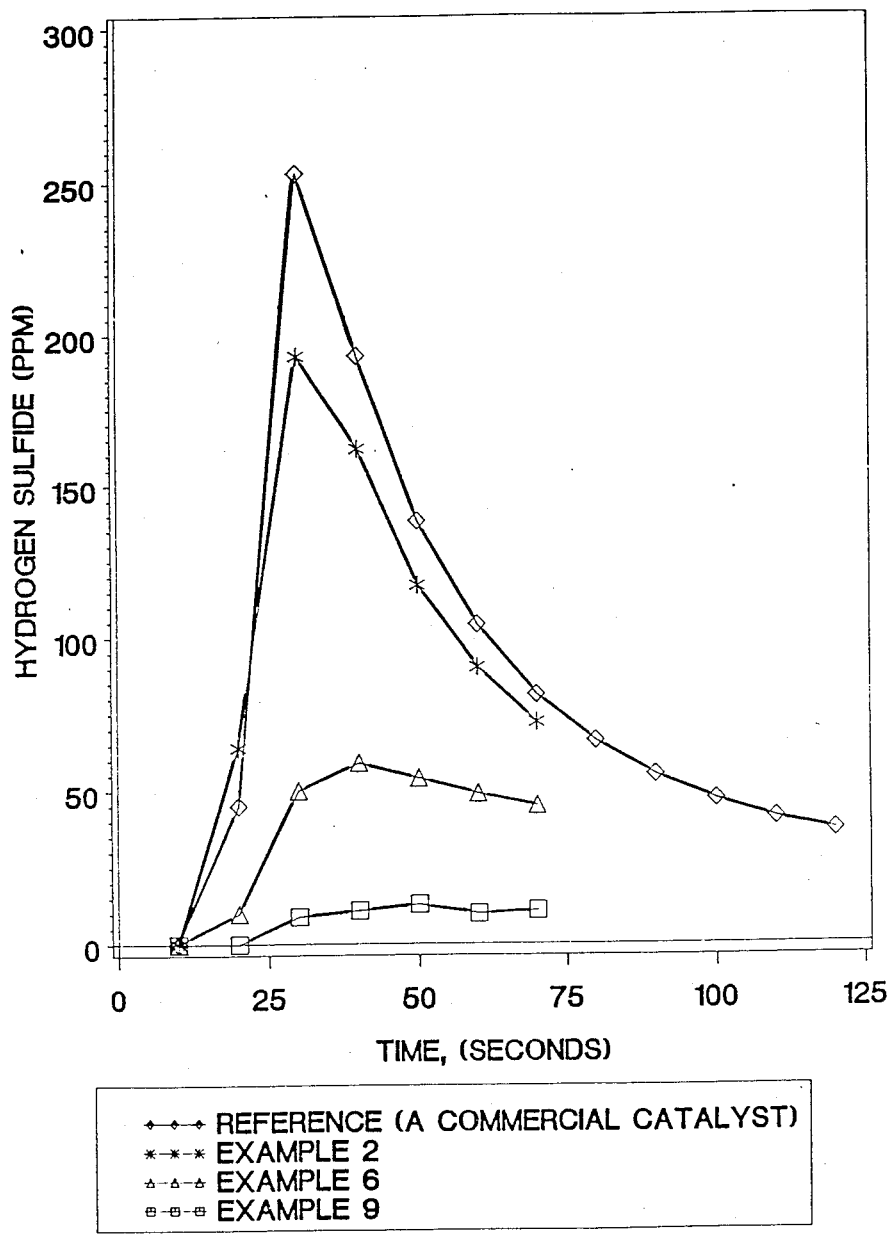

CATALYSTS FOR CONTROLLING AUTO EXHAUST EMISSIONS INCLUDING HYDROCARBON, CARBON MONOXIDE, NITROGEN OXIDES AND HYDROGEN SULFIDE AND METHOD OF MAKING THE CATALYSTS

BACKGROUND OF THE INVENTION

1. Field of the Invention

This invention relates to catalyst compositions and methods of producing auto exhaust catalysts that make no $H_2S$ odor from the tail pipe, while still meeting catalytic performance requirement for three-way conversions.

2. Description of the Previously Published Art

With the advent of advanced catalysts for controlling auto exhaust emissions, typically containing a higher than usual level of rare earth oxides, especially ceria, the level of $H_2S$ emission from tail pipes has significantly increased to the extent that the strong $H_2S$ odor can no longer be tolerated.

In practice, however, it is rather difficult to develop an auto exhaust catalyst that meets the requirements for both the long-term catalytic performance for three-way conversions as well as $H_2S$ because of the following fact: The performance of the catalyst which has already been optimized for three-way conversions is bound to be sacrificed by any chemical modification introduced to the existing catalyst to meet the requirement for $H_2S$.

In our U.S. Pat. No. 4,591,580 we disclosed a stabilized and doubly promoted platinum group catalyst. The alpha-alumina formation was greatly reduced by stabilizing a transitional alumina support with lanthana or La-rich rare earth oxides while still maintaining high catalytic performance. This catalyst comprises four material components which are (1) support or carrier, (2) stabilizer, (3) promoters which are preferably $CeO_2$ and alkali metal oxides and (4) catalytic metals. The description of this catalyst did not have any discussion of the $H_2S$ problem in auto emission control nor did the description provide any suggestion on how to solve the problem. There was disclosed an optional embodiment in which Ni could be added from 0.5 to 20 wt. % NiO. However, that nickel was being added to improve the catalyst efficiency for hydrocarbon conversion and especially as a three-way catalyst (TWC) and there was no attempt made to increase the concentration of the NiO in the outer region of the support.

3. Objects of the Invention

It is an object of this invention to chemically modify the auto exhaust emission control catalyst formulation to virtually eliminate the $H_2S$ odor while still maintaining adequate catalyst performance for controlling hydrocarbon (HC), carbon monoxide (CO), and nitrogen oxides ($NO_x$).

It is a further object of this invention to disclose a method whereby a slight and yet effective chemical modification can make a TWC highly efficient in lowering $H_2S$ emission from the tail pipe while retaining virtually all or adequate catalyst efficiency for three-way conversions.

It is a further object of this invention to add an $H_2S$ gettering ingredient to an auto exhaust emission control catalyst while maintaining the activity for the control of the other emissions.

It is a further object of this invention to add an $H_2S$ gettering ingredient to an auto exhaust emission control catalyst in a manner so as to achieve a maximum effect on $H_2S$ control using a minimal level of $H_2S$ gettering ingredients.

It is a further object of this invention to add an $H_2S$ gettering ingredient to an auto exhaust emission control catalyst by controlling the getter penetration depths to approximately 600 microns, preferably to approximately 300 microns, so that the $H_2S$ getter concentration within this outer layer will be much higher than the average getter concentration throughout the support.

These and further objects will become apparent as the description of the invention proceeds.

SUMMARY OF THE INVENTION $H_2S$ emission can be effectively lowered by including $H_2S$ gettering ingredients such as Ni and/or Fe oxides in the catalyst formulation, especially when the formulation is based on alumina-silica.

The catalyst of this invention consists of noble metals promoted with ceria-rich rare earth oxides, preferably doubly promoted along with alkali metal oxides, and oxides of nickel and/or iron as an $H_2S$ gettering ingredient. The oxides of nickel and/or iron are present in an $H_2S$ gettering effective amount and in an amount up to 10 wt %. In the event that only nickel oxide is used, then the maximum concentration of the NiO in the first 300 micron layer is at least about twice its average concentration throughout the support. The average concentration is obtained by grinding up the particle and determining the amount of nickel oxide per weight of the catalyst. The alumina support can have additionally from 0 to 20% $SiO_2$ present. This catalyst, capable of controlling not only HC, CO and NOx but also $H_2S$ emission from the tail pipe of catalytic converter-equipped automobiles, works especially well when supported on alumina-silica, containing silica from 0.1% to 20%, preferably from 1% to 15% by weight.

The catalysts which are suitable for use as a catalyst for auto emission control according to the present invention and which will have the $H_2S$ gettering ingredient added preferably are those as described in our U.S. Pat. No. 4,591,580, the entire contents of which are incorporated herein by reference. The catalysts have an alumina support or a alumina-silica support with components deposited thereon such as lanthana as a stabilizer in an amount of about 1 to 10% by weight expressed as $La_2O_3$ which is either in the form of lanthana only or in the form of lanthana-rich rare earth oxides where the $La_2O_3$ is at least 50% by weight of the total rare earth oxides, 1–20% by weight of ceria as a promoter, at least 0.5 to about 5% by weight of an alkali metal oxide as a promoter, and a catalytically-effective amount of one or more platinum group metals.

The metals concentration profile determined by the layer abrasion test described in U.S. Pat. No. 4,152,301 has a maximum platinum concentration within about 50 microns of the exterior surface of the support and no more than about 70% of the total platinum loaded is located within about 100 microns depth. For rhodium, the maximum concentration is within about 50 microns of the exterior surface of the support and no more than about 95% of the total rhodium loaded is located within about 100 microns depth.

The method of making these unique catalysts essentially involves the control of penetration depths of extra base metal ingredients introduced to the catalyst so as to achieve a maximum effect on $H_2S$ control using a minimal level of $H_2S$ gettering ingredients. The desirable depth for concentrating such an $H_2S$ gettering ingredient is approximately 600 microns and more preferably 300 microns. Details of the method are illustrated in Examples 5, 6 and 9 where the depth is determined by visual measurement under microscope.

BRIEF DESCRIPTION OF THE DRAWING

The FIGURE is a graph of $H_2S$ catalyst performance over time.

DESCRIPTION OF THE PREFERRED EMBODIMENTS

The level of $H_2S$ emission can be drastically lowered when $H_2S$ gettering ingredients such as Ni and/or Fe oxides are present in sufficient concentration within the outer layer of the beads. Sufficient $H_2S$ getter concentration with little sacrifice in TWC performance is obtained by controlling the catalyst preparation process. Preferred techniques include an exposure to anhydrous ammonia following impregnations with solutions bearing nickel or iron, and the adjustment of pH of ferric nitrate solution to 1.0–1.40, preferably to 1.20–1.30.

An excessively high concentration of $H_2S$ getter ingredient in the outer layer of the beads is undesirable for TWC performance as pointed out in Example 10 for the catalyst of Example 5. Most important of all, the best $H_2S$ result, i.e., the lowest ppm $H_2S$ observed, can be obtained when the $H_2S$ getter ingredient is coupled with alumina-silica base. This is shown in Example 9. The most important point to be emphasized for the catalyst of this invention, however, is to achieve a balance between two different classes of base metal oxides within the outer layer of approximately 300-micron thickness, one primarily for promoting for the three-way conversion, i.e., ceria and alkali metal oxides, the other for the $H_2S$ gettering, i.e., Ni and/or Fe oxides. By achieving the best possible ratio between these two different classes of ingredients within the outer layer one can make the catalyst meet the requirements for both three-way conversion as well as $H_2S$ gettering.

Although the two classes of base metal can be added separately to achieve the desired balance, in some instances they can be added together. For example, as illustrated in Example 6, we found it necessary to incorporate some additional ceria, which is a promoter for three-way conversion, and not used for $H_2S$ gettering, along with the $H_2S$ getter especially when the getter was Fe oxides.

The catalysts according to the present invention can be prepared in the following manner. First, the starting material, either alumina or alumina-silica pellets (or particles) are precalcined at 300°–1000° C., preferably at 400°–600° C. to a total volatiles content of from 2 to 8 wt. %, preferably from 4 to 6 wt. %. The pellets are then impregnated with an aqueous solution bearing $La^{3+}$ ions, preferably in the form of La-nitrate or hydrous La-oxide, dried at 100°–150° C., and air calcined at temperatures of about at least 800° C. and more preferably at about 1000°–1100° C.

The resulting lanthana-stabilized alumina pellets are impregnated with an aqueous solution containing both $Ce^{3+}$ and $M+$ ions (where M is an alkali metal), preferably in the form of nitrates, dried at 100°–150° C., and air calcined at 500°–1100° C., preferably at 700°–1010° C.

The main component of the preferred support or carrier is a transitional alumina particle having a BET ($N_2$) surface area in the range from at least 20 to 200 $m^2/g$, preferably from about 70 to 150 $m^2/g$. When alumina-silica is used as the starting material, the preferred BET ($N_2$) surface area is approximately 100–200 $m^2/g$. The alumina or alumina-silica support material can be either a washcoat powder or a larger, formed pellet or particle. Lanthana or La-rich rare earth oxides comprise the stabilizer. When lanthana alone, without accompanying other rare earth oxides, is employed as a stabilizer, the desired level is from at least 0.5 to 10 wt. % $La_2O_3$. When La-rich rare earth (i.e., Ce-depleted rare earth mixture) oxide is used as a stabilizer, the $La_2O_3$ is at least 50% by weight of the total rare earth oxides and the desired level is from at least 1 to 10 wt. % $La_2O_3$. By Ce-depleted, we mean that the $CeO_2$ content when calcined will be no more than 15% and more preferably no more than 10% by weight. The preferred level of stabilizer, regardless of the source, is from 2 to 6 wt. % $La_2O_3$. This additive essentially stabilizes the transitional alumina support against hydrothermal severities, and hence, it will stabilize the promoters as well as the catalytic metals which are subsequently dispersed on the lanthana stabilized support.

It is not the intention of this invention to use lanthana in the form of mixed, unseparated rare earth oxides in naturally occurring ratios. In monazite, for example, $La_2O_3$ is only 19.5 wt. % of the rare earth oxides. This level of lanthana is too low. Although one might expect that larger amounts of the naturally occurring rare-earth oxide could be used to obtain the desired level of lanthana, this higher mixed oxide loading would begin to block the alumina pores and have other adverse catalytic effects—lower pore volume and higher density. Thus a lanthana enriched form of mixed rare earth oxides is desired with the lanthana being at least 50% by weight. This stabilization is an important feature of the invention and is applicable to all types of alumina—supported automotive emission control catalysts, oxidative, three-way, closed-loop-controlled, monolithic or pelleted.

Both ceria and alkali metal oxides are present as the promoter from at least 1 to 20 wt. % $CeO_2$, preferably from 2 to 10 wt. % $CeO_2$, and from at least 0.5 to 5 wt. %, preferably from 1 to 3 wt. % alkali metal oxides. This $CeO_2$ promoter is to be preferably added in a separate impregnation step from the lanthana stabilization step. In other words, when doing the initial lanthana stabilization step one cannot use a naturally occurring mixed rare earth oxide and expect that the $CeO_2$ contained in the mixed rare earth oxide will provide the desired level of $CeO_2$ promotion. Instead, it is preferred to add the $CeO_2$ in a later impregnation step.

The preferred $H_2S$-gettering materials are Ni and/or Fe oxides. Each has its own advantages, yet each also has disadvantages when used in excessive amounts. In addition it is especially advantageous to employ a preferred embodiment of the invention where the amount of the Ni or Fe is concentrated in the outer surface layer of the support. Nickel oxide is an effective $H_2S$ getter. However, OSHA has classified it as a carcinogen and thus it is not desirable to use it in large amounts. While iron oxide does not have any carcinogenicity problems, it does adversely affect the physical properties of the catalyst when used in large amounts. For example, the iron oxide will render the catalyst soft which in turn will adversely affect the attrition properties of the catalyst particles.

With both $Fe_2O_3$ and NiO the amount employed must be sufficient to provide the $H_2S$ gettering efficiency, yet it cannot be at such a high level that it blocks out the effects of the other components of the catalyst. In general, the combined total of NiO and/or $Fe_2O_3$ should be up to 10% and preferably from 0.5 to 5%.

According to an especially preferred embodiment, the NiO and/or $Fe_2O_3$ are concentrated in the outer layer of the support so that a high percentage of the $H_2S$ getter material is found at a depth within approximately 600 microns and more preferably within 300 microns. This result is achieved by first applying a solution containing these oxides to the TWC support, i.e., alumina or alumina-silica already stabilized with lanthana or La-rich rare earth oxides and promoted with ceria or doubly promoted with ceria-lithia. This can be done by spraying the particles in a rotary mixer. Then the particles are exposed to anhydrous ammonia gas. The total amount of anhydrous ammonia gas for this exposure must be sufficient to create an outer layer with a desired $H_2S$ getter concentration. When using an aqueous solution containing $Fe^{3+}$ ions, e.g., typically a ferric nitrate solution, it is also preferable to adjust the pH of the solution to a range of 1.0–1.4, preferably to 1.2–1.3. In general, the Fe penetration depth increases as the pH of the ferric nitrate solution decreases.

The general procedure described above essentially involves the following steps: (1) alumina precalcination; (2) alumina stabilization with lanthana or lanthana-rich rare earth oxides; (3) incorporation of promoter(s) such as ceria and alkali metal oxides; and (4) incorporation of $H_2S$ getter ingredient such as Ni and/or Fe oxides. As illustrated in our examples, in one of our preferred procedures, steps (2) and (3) are combined together. It is also possible to combine steps (3) and (4). Except for lithia, alkali metals are incorporated along with one or more of the catalytic metals in most cases.

The stabilized, singly or doubly promoted and $H_2S$ gettered support thus obtained is impregnated in a single or multiple steps with solutions bearing Pt-group metals. Sulfito complexes are esupecially preferred sources to both Pt and Pd. In the preferred embodiment the solutions are multiply impregnated. After each impregnation the pellets are allowed to stand at room temperature for up to six hours, preferably from 0 to 4 hours, more preferably from ½ to 4 hours before drying at 100°–150° C. Finally, the catalyst is activated at 250°–550° C. and preferably in flowing $N_2$ containing 3–5 vol. % $H_2$. More preferably, the catalyst is activated at 550°–650° C. in flowing $N_2$ containing 3–5 vol. % $H_2$ along with 20–50 vol. % steam. It is also possible that the alkali metal ingredient can be incorporated along with noble metals other than Rh. Furthermore, optionally, Ni can also be incorporated along with noble metals other than Rh.

The platinum group metal component may be platinum, palladium, rhodium, ruthenium, iridium, osmium, and mixtures thereof, with the preferred metals being Pt, Pd, Rh either alone or in any combination. When the platinum group metal contains more than one of such components, the component may be composed of a major amount of platinum or palladium and a minor amount of one or more of the other platinum group metals such as rhodium. When platinum and palladium are used alone, they can be in any ratio. The catalytic metals mixture may comprise from 0 to about 20 wt. % rhodium, or mixtures thereof and preferably about 10 wt. % rhodium and about 90 wt. % platinum, palladium, or mixtures thereof.

Various compounds, complexes, or fine metal dispersions of any of the platinum group metals in an aqueous or an organic medium may be used to achieve deposition of the platinum group metal component on the composite. A suitable liquid medium will not react with the platinum group metal component and is removable on drying which can be accomplished as part of the preparation or in use of the catalyst. Water soluble platinum group metal compounds or complexes may conveniently be used. Suitable platinum group metal compounds include chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

In a preferred embodiment of this invention, the impregnation solution contains sulfito complexes of platinum group metals, especially for platinum and palladium. For platinum and palladium, either an acid or an ammonium sulfito complex can be used. The most preferred platinum source is the ammonium sulfito complex prepared according to the methods described in U.S. Pat. No. 3,932,309 (Graham et al). The use of these complexes provides excellent dispersion and control of penetration depth of the platinum group metal. Rhodium can be incorporated in the catalyst by impregnation with an acid rhodium sulfito complex prepared by reacting rhodium trichloride or rhodium hydrous oxide with sulfurous acid. A rhodium nitrate solution can be substituted, in part, or entirely for an acid sulfito complex solution of rhodium.

In a preferred embodiment the platinum group metals penetrate the pelleted support to an average distance less than approximately 300 microns as measured by the $SnCl_2$ solution staining method. However, when the platinum group metals are rich in palladium, then the palladium may penetrate deeper than 300 microns.

In a preferred embodiment of this invention the pellets are held preferably for about two hours at room temperature after each impregnation is completed with the metal or metals. The composition may then be dried, for example, at a temperature of from about 100° C. to about 150° C. for about 2 to about 20 hours. The salt composition may be decomposed and the catalyst activated under conditions which provide a composition having characteristics that promote the desired reaction. The temperature of this activation is low enough to permit neither noble metal sintering nor sintering of the support. It is preferably done in a reducing atmosphere, e.g., by about a 1 hour reduction in flowing nitrogen containing 5 volume percent hydrogen at about 250°–550° C. and more preferably at about 400° C. For the catalyst of this invention, the most preferred catalyst activation procedure is to treat in flowing $N_2$ containing 3–5 vol. % $H_2$ along with 20–50 vol. % steam at 550°–650° C.

In the catalyst of this invention, the platinum group metals provide the catalytically active surfaces for oxidation, reduction and decomposition reactions and are present in amounts sufficient to provide catalytic compositions having significant activity for catalyzing these reactions. Generally, the amount of platinum group metal used is a minor portion of the catalyst composite and typically does not exceed about 10 weight percent of the calcined composite. The amount may be about 0.05 to 10 percent and is preferably about 0.1 to 6 percent based on the weight of the calcined composite to maintain good activity with prolonged use.

The La-stabilized catalyst, which is especially suitable for use as a three-way catalyst for auto emission, is preferably made by impregnating an alumina support which has been heated to at least 300° C. with a solution containing a lanthanum salt. This salt is either in the form of just a lanthanum salt only or in the form of lanthanum-rich rare earth salts which upon calcination give rare earth oxides where $La_2O_3$ is at least 50% by weight of the total rare earth oxides.

The impregnated support is heated to at least decompose the lanthanum salt so as to obtain a lanthana impregnated support. In a preferred embodiment the heating is done at a temperature of from about 800° to 1100° C. to thermally stabilize the support. Next, promoters an $H_2S$ gettering metal oxide selected from the group consisting of NiO, $Fe_2O_3$ and mixtures thereof, and one or more platinum group metals are applied by either one of the two procedures. In the first procedure the lanthana-impregnated alumina support is impregnated with a soluble cerium salt solution. The impregnated support is heated to at least decompose the cerium salt so as to obtain a lanthana-ceria impregnated support. Then the lanthana-ceria impregnated support is impregnated with solutions bearing one or more platinum group metals, said $H_2S$ gettering meal oxide, and at least one alkali metal.

In the second procedure the lanthana impregnated support is impregnated with a solution containing a soluble cerium salt and a lithium salt. The impregnated support is heated to at least decompose the cerium and lithium salts to obtain a lanthana-ceria-lithia impregnated support. Then the lanthana-ceria-lithia impregnated support is impregnated with solutions bearing one or more platinum group metals to form a catalyst.

When the catalyst is being formed by either of these two methods, it is air dried at an ambient temperature for 0-4 hours and then at about 100°-150° C. so as to dry the catalyst after each impregnation with the solutions bearing the catalytic metals. During one of the earlier heating steps the catalyst is heated to a temperature of at least 800°-1100° C. and finally it is activated at a temperature of about 250°-550° C. with the preferred activation being done in the presence of hydrogen, more preferably at 550°-650° C. in the presence of 20-50 vol. % steam along with 3-5 vol. % hydrogen. As a result of the reduction the $H_2S$ gettering metal oxide are no longer in the form of a stoichiometric oxide, but rather they are deficient in oxygen.

The preferred methods for providing platinum group metals have been discussed above.

When the solutions of cerium salt and lithium salt are applied in the second procedure they can be added either (a) by first a cerium salt followed by a lithium salt, (b) by first a lithium salt followed by cerium salt or (c) by a simultaneous application of a mixture of the cerium salt and the lithium salt.

In the other embodiment according to the present invention, catalysts with long term durability can be made which do not require the same degree of hydrothermal stability provided by the lanthana stabilization. In this method, the catalyst, which is suitable for use as a three-way catalyst for auto emission, is preferably made by applying promoters and at least two platinum group metals by one of two procedures. In the first procedure an alumina support which has been heated to at least 300° C. is impregnated with a soluble cerium salt solution. The impregnated support is heated to at least decompose the cerium salt to obtain a ceria impregnated support. Then the ceria impregnated support is impregnated with solutions bearing one or more platinum group metals and at least one alkali metal, and further including a Rh-containing solution which has at least part of the Rh solution impregnated separately from the other platinum group metal solutions and alkali metal-bearing solutions.

In the second procedure the alumina support which has been heated to at least 300° C. is impregnated with a solution containing a cerium salt and a lithium salt. The impregnated support is heated to at least decompose the cerium and lithium salts to obtain a ceria-lithia impregnated support. Then the ceria-lithia impregnated support is impregnated with solutions bearing one or more platinum group metals including Rh and where at least part of the Rh-containing solution is impregnated separately from the other platinum group metal solutions to form a catalyst.

When the catalyst is being formed by either of these two methods, it is air dried at an ambient temperature for 0-4 hours and then at about 100°-150° C. so as to dry the catalyst after each impregnation with the solutions bearing catalytic metals. During one of the heating steps the catalyst is heated to a temperature of at least 800°-1100° C. and finally it is activated at a temperature of about 250°-550° C. with the preferred activation being done in the presence of hydrogen. The preferred methods for providing platinum group metals have been discussed above. It is especially preferred to have the Rh-containing solution further contain a penetration aid.

When the solutions of cerium salt and lithium salt are applied in the second procedure they can be added either (a) by first a cerium salt followed by a lithium salt, (b) by first a lithium salt followed by cerium salt or (c) by a simultaneous application of a mixture of the cerium salt and the lithium salt.

Having described the basic aspects of our invention, the following examples are given to illustrate specific embodiments thereof.

EXAMPLE 1

Alumina beads containing 1 wt. % $La_2O_3$ were produced from a pseudo-boehmite slurry with lanthanum nitrate according to U.S. Pat. No. 4,179,408, dried and air calcined at 1038° C. for 1 hour. A 12.057 kg portion of the above beads having a bulk density of 0.6078 g/cc, a water pore volume of 0.76 cc/g, and a BET ($N_2$) surface area of 132 m²/g was impregnated with fine mist of cerous nitrate solution using atomizing nozzles to the extent of 90% of incipient wetness. The cerous nitrate solution was prepared by diluting 2594.3 g of a concentrated cerous nitrate solution having a concentration of 0.3000 g $CeO_2$/g solution to approximatley 7300 ml. This solution was then pH adjusted from 2.20 to 3.01 using 50-fold diluted $NH_4OH$. The solution was further diluted with deionized water to approximately 8100 ml. The amount of cerous nitrate applied was to ensure 6% $CeO_2$ in support, allowing 2% excess cerous nitrate to account for the loss due to non-washout of hold tank. After the cerous nitrate solution was applied, the wet beads were exposed to anhydrous ammonia gas flowing at a rate of 0.965 mole/minute for 11 minutes. The beads were then dried in a mechanical convection oven at 135° C. Finally, the beads were air calcined at 996° C. for 1 hour. The resulting beads had the following properties: 0.6521 g/cc bulk density, 0.70 cc/g water pore volume, 0.72% total volatiles, and 106 m$^2$/g BET (N$_2$) surface area.

A 273.02 g portion of the above described beads were impregnated at 95% incipient wetness with a rhodium sulfito complex solution. The rhodium sulfito complex solution was prepared by reacting 0.3783 g rhodium trichloride solution (5.501% rhodium content) with an H$_2$SO$_3$ solution containing 0.0408 g SO$_2$ in a total volume of 11 ml at 60° C. for two hours. At the end of the reaction period the solution was cooled and diluted with water to 150 ml after which 0.0954 g dibasic ammonium citrate was added and the solution finally diluted to 183 ml.

The solution was sprayed through atomizing nozzles. The wet impregnated beads were allowed to stand at ambient temperature after which they were dried at 135° C. in a mechanical convection oven. Once the beads were dry, and had been cooled to room temperature they were reimpregnated at 90% incipient wetness with a solution prepared by diluting 3.5990 grams of (NH$_4$)$_6$Pt(SO$_3$)$_4$ solution having a platinum concentration of 9.6376% to a volume of 173 ml. After application of the solution by atomizing spray, again the wet beads were allowed to stand at ambient temperature for two hours. They were subsequently dried at 135° C. The beads were then reductively activated at 640° C. for one hour in a stream of 40 vol. % steam, 57 vol. % nitrogen and 3 vol. % hydrogen.

The overall non-noble metal composition (wt. %) of the resulting catalyst is 6% CeO$_2$, 0.94% La$_2$O$_3$, and balance Al$_2$O$_3$. The noble metals loading (g metal/liter) for this catalyst is 0.791 Pt and 0.0475 Rh.

EXAMPLE 2

Beginning with 273.02 g of ceria-lanthana-containing alumina beads described in Example 1, this catalyst was prepared in exactly the same manner as in Example 1, except that 2.927 g of KNO$_3$ (100.6% assay) was included in the rhodium application step instead of ammonium citrate.

The overall non-noble metal composition (wt. %) of the resulting catalyst is 6% CeO$_2$, 0.94% La$_2$O$_3$, 0.5% K$_2$O and balance Al$_2$O$_3$. The noble metals loading for this catalyst is identical to that of the catalyst in Example 1.

EXAMPLE 3

A 273.02 g portion of the ceria-lanthana-containing alumina beads described in Example 1 was impregnated at 95% incipient wetness with a solution containing rhodium and nickel. The solution was prepared by combining 0.2110 g rhodium nitrate solution (9.865% rhodium by weight) and 6.936 g of nickelous nitrate solution which has a titer equivalent to 0.1948 g NiO/g of solution. This combined rhodium and nickel solution was diluted to 183 ml after which it was applied to the beads using atomizing nozzles. The impregnated beads were held in the wet state for two hours prior to drying at 135° C. Once dried, the beads were reimpregnated with a platinum-containing solution at 90% incipient wetness. This solution was prepared by diluting 3.5990 g (NH$_4$)$_6$Pt(SO$_3$)$_4$ solution (9.6376% Pt) to a total volume of 173 ml. Again the beads were sprayed using atomizing nozzles. The beads were again held at ambient temperature for two hours in the wet state followed by drying at 135° C. The catalyst was reductively activated in the same manner as in Example 1.

The overall non-noble metal composition (wt. %) of the resulting catalyst is 6% CeO$_2$, 0.94% La$_2$O$_3$, 0.5% NiO, and balance Al$_2$O$_3$. The noble metal loading for this catalyst is identical to that of the catalyst in Example 1.

EXAMPLE 4

A large batch of alumina beads was precalcined for 16 hours in 538° C. air. A 450 g (445.3 g on a dry basis) portion of the precalcined beads having a water pore volume of 1.203 cc/g was sprayed with a mixed nitrate solution which was prepared as follows: 137.56 g of cerous nitrate solution bearing 28.73 g CeO$_2$ was mixed with 16.35 g of solution bearing 1.19 g Nd$_2$O$_3$ and 2.60 g La$_2$O$_3$. After diluting the solution with deionized water to approximately 500 ml, pH of the solution was raised to 3.00 using dilute HNO$_3$ solutions. Finally, the solution was further diluted to 560 ml. The impregnated beads sealed in a rotary mixer were then exposed to flowing anhydrous ammonia for 8 minutes at a rate of 29.4 millimoles per minute while the rotary mixer was on. The beads were dried in 135° C. air overnight, and calcined in 982° C. air for 1 hour. The resulting beads in the 5 to 10 mesh size range had a bulk density of 0.4815 g/cc and a water pore volume of 0.9943 cc/g. The composition of these beads was 6% CeO$_2$, 0.75% La$_2$O$_3$, 0.25% Nd$_2$O$_3$, and balance Al$_2$O$_3$.

A 300 cc portion of the above beads in a rotary mixer was first sprayed with 26 ml of nickelous nitrate solution bearing 3.92 g of NiO, and then with 62 ml of potassium nitrate solution bearing 0.774 g of K$_2$O. The rotary mixer was kept on for 5 additional minutes after the spraying was completed. The beads sealed in the rotary mixer were then exposed to flowing anhydrous ammonia at a rate of 3.5 millimoles per minute for 8 minutes while the rotary mixer was still kept on. After holding at room temperature for one-half hour, the beads were dried in a 135° C. oven overnight. The dried beads in the rotary mixer were resprayed with fine mist of noble metal-bearing solution, which was prepared as follows: Approximately 100 ml of solution bearing 246.7 mg of platinum in the form of (NH$_4$)$_6$Pt(SO$_3$)$_4$ was adjusted to a pH of 3.50. To this was added 2.96 g of rhodium nitrate solution bearing 14.8 mg of rhodium. The resulting solution having a pH of 2.91 was diluted with water to 123 ml.

Finally, the catalyst was reduced in exactly the same manner as in Example 1. The overall non-noble metal composition of the resulting catalyst is as follows: 5.89% CeO$_2$, 1.37% NiO, 0.74% La$_2$O$_3$, 0.53% K$_2$O, 0.25% Nd$_2$O$_3$, and balance Al$_2$O$_3$. The noble metals loading of this catalyst is identical to that of the catalyst in Example 1.

EXAMPLE 5

A large lot of alumina beads containing 6% CeO$_2$, 0.75% La$_2$O$_3$, and 0.25% Nd$_2$O$_3$ was prepared in exactly the same manner as in Example 4. A 300 ml portion of these beads in the 5 to 8 mesh size range, having a bulk density of 0.579 g/cc and a water pore volume of 0.772 cc/g, was placed in a rotary mixer, and sprayed with a solution which was prepared as follows: Approximately 80 ml of potassium nitrate solution containing 0.886 g of K$_2$O was adjusted to a pH of 1.38 using dilute nitric acid. To this was added 27.3 g of ferric nitrate solution bearing 2.54 g of Fe$_2$O$_3$. The resulting solution having a pH of 0.97 was diluted with water to 121 ml. The beads were kept mixing in the rotary mixer for an additional 5 minutes after the spraying was completed. The beads were then exposed to flowing anhydrous ammonia for 8 minutes at a rate of 5.7 millimoles per minute while the mixer was on. After holding at room temperature for one-half hour the beads were dried in a 135° C. oven overnight.

Twenty-five beads were then taken out of this batch and were air calcined at 593° C. for one hour. Each bead was cleaved into two halves for examination under a microscope at 300X magnification to determine the extent of Fe penetration. The average of a total of 50 readings, two readings from each bead, showed approximately 350 microns.

The dried beads were resprayed with fine mist of solution bearing noble metals which was prepared as follows: Approximately 90 ml of solution bearing 246.7 mg of platinum in the form of $(NH_4)_6Pt(SO_3)_4$ was adjusted to a pH of 3.50 using dilute nitric acid. To this was added 2.96 g of rhodium nitrate solution bearing 14.8 mg of rhodium. The resulting solution having a pH of 2.91 was diluted with water to 114 ml. After holding the beads for 1 hour at room temperature, the beads were dried in a 135° C. oven overnight. Finally, the catalyst was activated by reduction in exactly the same manner as in Example 1. The overall non-noble metal composition (wt. %) of this resulting catalyst is as follows: 5.88% $CeO_2$, 1.43% $Fe_2O_3$, 0.74% $La_2O_3$, 0.5% $K_2O$, 0.25% $Nd_2O_3$ and balance $Al_2O_3$. The noble metals loading in this catalyst is identical to that of the catalyst in Example 1.

EXAMPLE 6

Approximately 75 ml of ferric nitrate solution bearing 1.228 g of $Fe_2O_3$ were mixed with 3.06 g of cerous nitrate solution bearing 0.879 $CeO_2$. The resulting solution having a pH of 1.20 was diluted with water to 121 ml. Another 300 ml portion of the alumina beads with $CeO_2$-$La_2O_3$-$Nd_2O_3$ described in Example 5 was sprayed with 121 ml of the above-readied solution. The impregnated beads in the rotary mixer were sealed and exposed to flowing anhydrous ammonia for 8 minutes at a rate of 3.1 millimoles per minute while the mixer was on. After holding the beads at room temperature for 1 hour, the beads were dried at 135° C. overnight, and then calcined in 593° C. air for 1 hour.

Twenty-five beads were removed from this batch for microscopic examination for the extent of Fe penetration in the same manner as in Example 5. The average Fe penetration was approximately 180 microns.

The beads were then resprayed with fine mist of solution which was readied as follows: To approximately 40 ml of potassium nitrate solution bearing 0.886 g of $K_2O$ was added 49.35 g of $(NH_4)_6Pt(SO_3)_4$ solution bearing 246.7 mg of platinum. The mixed solution was adjusted to a pH of 3.51 using dilute nitric acid. To this was added 2.96 g of rhodium nitrate solution bearing 14.8 mg of rhodium. The solution was then diluted with water to 114 ml. After holding the impregnated beads at room temperature for 1 hour, the beads were dried in a 135° C. oven. Finally, the catalyst was activated by the same reduction procedure as described in Example 1. The overall non-noble metal composition (wt. %) of the resulting catalyst is as follows: 6.4% $CeO_2$, 0.74% $La_2O_3$, 0.70% $Fe_2O_3$, 0.50% $K_2O$, 0.25% $Nd_2O_3$, and balance $Al_2O_3$. The noble metals loading in this catalyst is identical to that of the catalyst in Example 1.

EXAMPLE 7

Alumina-silica beads were produced from a pseudoboehmite slurry containing silica essentially based on U.S. Pat. No. 4,179,408. These beads after 1 hour activation at 538° C. had a bulk density of 0.5070 g/cc, a water pore volume of 0.88 cc/g, and a total volatiles content of 9.19%.

A 1000 g portion of the above activated beads were impregnated with a mixed solution of lanthanum, neodymium, and cerium nitrates. The solution was prepared by mixing 34.965 g lanthanum/neodymium (equivalent to 3/1 weight ratio of oxides) nitrate solution which has a titer of 0.2806 g of lanthanum and neodymium oxides per g of solution with 195.205 g cerous nitrate solution which has a titer of 0.3016 g ceric oxide per g solution. This solution was diluted to approximately 800 ml. The pH was adjusted from 1.80 to 3.00 using 50-fold dilute $NH_4OH$ solution. The solution was then applied to the activated alumina-silica beads by spraying through atomizing nozzles. Once all of the solution was applied, the beads were exposed to a flow of ammonia gas for 10 minutes at an ammonia flow rate of 38.3 millimoles per minute. The beads were then dried at 135° C. Once dried, the beads were activated at 1038° C. for one hour. The calcined beads had the following properties: bulk density 0.5572 g/cc, water pore volume 0.85 cc/g, total volatiles content 0.76%, and BET ($N_2$) surface area 178 m$^2$/g. The overall composition (wt. %) of the support was 6% $CeO_2$, 0.75% $La_2O_3$, 0.25% $Nd_2O_3$, 87.8% $Al_2O_3$ and 5.2% $SiO_2$.

A 225 g portion of the above resulting alumina-silica beads was double impregnated with solutions bearing platinum and rhodium. First of all, a rhodium-containing solution (prepared by reacting $RhCl_3$ and sulfurous acid for two hours at 60° C. with a $SO_2$/Rh molar ratio of 3/1 using a $RhCl_3$ solution bearing 2 mg Rh/ml) was prepared by diluting 12.21 g of rhodium sulfito complex solution having a titer of 0.001632 g Rh/g solution to 150 ml at which point 183 mg dibasic ammonium citrate was added and the solution finally diluted to 182 ml with deionized water. This rhodium-bearing solution was sprayed onto the support through atomizing nozzles. After application the wet beads were allowed to stand for two hours in the wet state. They were then dried at 135° C. After thorough drying the beads were reimpregnated with a platinum sulfito complex solution prepared by diluting 3.446 g $(NH_4)_6Pt(SO_3)_4$ solution having a platinum content of 9.638% with deionized water to 172 ml. The platinum solution was applied by spraying with atomizing nozzles. After platinum application, the wet beads were allowed to stand for 2 hours in the wet state. They were dried at 135° C. The impregnated and dried beads were then reduced in exactly the same manner as in Example 1. The noble metals loading in this catalyst is identical to that of the catalyst in Example 1.

EXAMPLE 8

Another 225 g portion of the alumina-silica beads described in Example 7 was double impregnated with rhodium-nickel and platinum. First, a mixed solution of nickelous nitrate and rhodium nitrate was prepared by combining 11.4027 g of $Ni(NO_3)_2$ solution having a titer of 0.1978 g NiO per g solution with 0.2020 g $Rh(NO_3)_3$ solution having a rhodium content of 9.865% and then diluting to 182 ml with deionized water. This solution was applied by spraying through atomizing nozzles. A two hour hold of the beads in the wet state was then followed by drying at 135° C. The beads were then reimpregnated with 3.446 g of $(NH_4)_6Pt(SO_3)_4$ solution having a platinum content of 9.638% which had been diluted to 172 ml. After application by spraying through atomizing nozzles, the beads were allowed to remain in the wet state for two hours. This was then followed by drying at 135° C. The impregnated and dried beads were reduced in flowing $N_2$ containing 38.9 vol. % steam, and 3 vol. % hydrogen at 1200° F. for one hour.

The catalyst was formulated to contain 1% NiO based on the total weight of the finished catalyst. The noble metals loading in this catalyst is identical to that of the catalyst of Example 1.

EXAMPLE 9

Another batch of alumina-silica beads were processed in exactly the same manner as in Example 5 to obtain supports with 6% $CeO_2$, 0.75% $La_2O_3$ and 0.25% $Nd_2O_3$. A 156.5 g portion of the resulting beads having 0.5215 g/cc bulk density and 0.902 cc/g water pore volume was sprayed with 127 ml of mixed nitrate solution containing 2.03 g of NiO and 0.796 g of $K_2O$. The beads in the rotary mixer were sealed off, and then were exposed to flowing anhydrous ammonia for 8 minutes at a rate of 3.6 millimoles per minute at room temperature while the rotary mixer was still turning. The beads were transferred into a stainless steel screen basket, held at room temperature for about ½ hour before being dried in a 135° C. oven. The beads were then resprayed with fine mist of solution bearing both platinum and rhodium. The impregnating solution was prepared as follows: Approximately 95 ml of solution containing 246.75 mg of platinum in the form of $(NH_4)_6Pt(SO_3)_4$ was adjusted to a pH of 3.53 using dilute nitric acid. To this was added 2.96 g of rhodium nitrate solution bearing 14.8 mg of rhodium. The mixed solution having a pH of 2.69 was diluted to 120 ml. The resulting beads were transferred into a stainless steel screen basket, held at room temperaure for 1 hour, dried in 135° C. air for 4 hours, and finally activated by the same reduction procedure as described in Example 1. The overall non-noble metal composition (wt. %) of the resulting catalyst was as follows: 5.89% $CeO_2$, 1.27% NiO, 0.74% $La_2O_3$, 0.50% $K_2O$, 0.25% $Nd_2O_3$, and balance $Al_2O_3$. The noble metals loading in this catalyst is identical to that of the catalyst in Example 1.

EXAMPLE 10

A fresh sample of each of the catalyst in Examples 1–9 was evaluated for $H_2S$ on the bench according to the following protocol: An 8.5 cc sample in a tubular Vycor glass reactor with 2.6 cm I.D. was heated to 560° C. in a preheated $N_2$ stream containing approximately 13% water vapor in a Vycor glass preheater being maintained at 650° C. wall—flowing at a rate of approximately 3.3 liters total/min. Once 560° C. is reached, all component gases in Table I but CO, $H_2$, $O_2$ and $SO_2$ are introduced into the feed gas. Then $SO_2$ along with $CO+H_2$ and $O_2$ gases are admitted at controlled rates to establish a steady lean condition represented in Table I by coupling a pair of solenoid valves with two pairs of timers while maintaining a total gaseous flow rate of 4.25 liters per minute at room temperature and 1 atm. pressure. After exposing the catalyst sample to this lean condition for 30 minutes, the condition is changed to a rich condition shown in Table I simply by resetting the two pairs of timers. As soon as the operating condition is switched to the rich condition from the lean condition, 300-fold diluted sample of the outlet gas is sampled once every 10 seconds. The digital readout in ppb of $H_2S$ is converted to ppm $H_2S$ taking the dilution factor into account. To assess the stability of catalyst performance in $H_2S$ emission, such tests are repeated on one sample up to 4 times by repeating the lean (30 min.)-rich (2 min.) cycles.

TABLE I

| Laboratory Test Conditions for $H_2S$ | |  |
| --- | --- | --- |
| Catalyst Charge, cm³ | | 8.5 |
| Total Gas Flow Rate, liter (NTP)/min. | | 4.25 |
| GHSV | | 30,000 |
| Feed Composition (vol. %) | | |
| Component | Lean Condition | Rich Condition |
| CO | 0.18 | 5.00 |
| $H_2$ | 0.06 | 1.67 |
| HC ($C_3H_6/C_3H_8 = 3$) | 0.0400 | 0.0400 |
| $O_2$ | 1.26 | 0.22 |
| $CO_2$ | 14.5 | 14.5 |
| $H_2O$ | 10 | 10 |
| $SO_2$ | 0.0020 | 0.0020 |
| $N_2$ | Balance | Balance |
| Bed Temperature, °C. | 560 | 560 |
| P, inches of Water | 9.5 | 11.0 |
| $H_2S$ Analyzer | Jerome, Model 621, with 3X dilution coupled with two 10:1 Jerome dilution modules in series. | |

The FIGURE shows the catalyst performances in the first tests on the catalysts of Examples 2, 6 and 9. Catalysts without $H_2S$-getter ingredient such as that of Example 2 usually exhibit the highest $H_2S$ emission in the vicinity of 30 seconds, i.e., at the time of the third sampling. This time for the peak level of $H_2S$ emission is related, in part, to the way the bench test unit is set up, e.g., the volume of preheater, total flow rate of feed gas, and the volume of sampling system, etc. Because the $H_2S$ odor must be more closely related to the level of peak $H_2S$ emission, the peak $H_2S$ levels found in the bench tests are tabulated in Table II as an indication of the catalyst performance in limiting $H_2S$ smell.

Also included in Table II is the $H_2S$ result on a reference catalyst, a commercial TWC identical in noble metals loading to that of the catalysts in Examples 1–9. These $H_2S$ results and catalyst performance data described in Example 11 show how these TWC performance data were obtained and clearly demonstrate that the level of $H_2S$ emission can be drastically lowered when $H_2S$ gettering ingredients such as Ni and/or Fe oxides are present in sufficient concentration within the outer layer of the beads. Some of the steps introduced in catalyst preparations, e.g., an exposure to anhydrous ammonia following impregnations with solutions bearing nickel or iron, and the adjustment of pH of ferric nitrate soltuion to 1.20–1.30, represent the means whereby we were able to achieve sufficient $H_2S$ getter concentration with little sacrifice in TWC performance. As revealed in the results of Example 5, an excessively high concentration of $H_2S$ getter ingredient in the outer layer of the beads appears to be undesirable. Most important of all, the best $H_2S$ result, i.e., the lowest ppm $H_2S$ observed, can be obtained when the $H_2S$ getter ingredient is coupled with alumina-silica base. This is revealed in the result of Example 9.

TABLE II

HTA and H₂S results on Catalysts

| Example | Base | Extra BM Wt. % | Rich ← 0.75 HC | CO | NO | 0.85 HC | CO | NO | 1.0 HC | CO | NO | 1.15 HC | CO | NO | → Lean 1.5 HC | CO | NO | CO/NO | ppm H₂S Obs. in Tests 1st | 4th |
|---|---|---|---|---|---|---|---|---|---|---|---|---|---|---|---|---|---|---|---|---|
| 1 | Alumina | Nil | 33 | 55 | 56 | 44 | 61 | 61 | 58 | 70 | 68 | 71 | 83 | 74 | 78 | 92 | 61 | 61 | 194 | |
| 2 | Alumina | 0.5% K₂O | 44 | 62 | 78 | 59 | 70 | 84 | 75 | 83 | 88 | 81 | 92 | 85 | 79 | 95 | 65 | 88 | 193 | |
| 3 | Alumina | 0.5% NiO | 47 | 64 | 71 | 62 | 70 | 79 | 81 | 80 | 89 | 90 | 91 | 90 | 88 | 95 | 67 | 90 | 275 | |
| 4 | Alumina | 1.37% NiO 0.53% K₂O | 52 | 61 | 80 | 68 | 70 | 87 | 83 | 84 | 91 | 87 | 94 | 84 | 85 | 63 | 89 | 40 | | |
| 5 | Alumina | 1.43% Fe₂O₃ 0.5% K₂O | 29 | 47 | 37 | 43 | 57 | 51 | 61 | 75 | 67 | 73 | 89 | 73 | 76 | 94 | 58 | 28 | 45 | 54 |
| 6 | Alumina | 0.7% Fe₂O₃ 0.5% CeO₂ 0.5% K₂O | 42 | 52 | 60 | 54 | 62 | 70 | 69 | 78 | 80 | 79 | 90 | 81 | 80 | 94 | 62 | 82 | 59 | |
| 7 | Alumina Silica | Nil | 32 | 41 | 50 | 42 | 48 | 54 | 55 | 61 | 63 | 66 | 78 | 69 | 75 | 90 | 55 | 65 | 126 | |
| 8 | Alumina Silica | 1% NiO | 33 | 38 | 50 | 45 | 47 | 58 | 65 | 65 | 73 | 79 | 84 | 81 | 83 | 92 | 64 | 82 | 93 | |
| 9 | Alumina Silica | 1.27% NiO 0.5% K₂O | 48 | 43 | 76 | 58 | 57 | 82 | 77 | 77 | 91 | 83 | 89 | 86 | 81 | 92 | 64 | 88 | 13 | 33 |
| Reference | — | | 54 | 58 | 65 | 60 | 65 | 68 | 65 | 75 | 70 | 70 | 84 | 69 | 74 | 93 | 51 | 69 | 253 | |

*R value, a measure of air/fuel ratio is defined as follows:

$$R = \frac{[O_2] + 0.5 [NO]}{0.5 [CO] + 0.5 [H_2] + 4.5 [C_3H_6] + 5 [C_3H_8]}$$

where the concentration of each gaseous component is in vol. % or mole %. R < 1, R = 1, and R > 1 thus represent net reducing, stoichiometric, and net oxidizing conditions, respectively.

EXAMPLE 11

Because it is important to ascertain that the H₂S-fixed catalysts exhibit sufficient performance for three-way conversions, we have evaluated on the bench each of the above catalysts of Examples 1-9 after hydrothermal aging (HTA). The bench evaluation of catalyst performance is based on the cycling test procedure for TWC described by M. V. Ernest and G. Kim in SAE Paper No. 800083. The protocol established for HTA closely approximates one of the rapid aging procedures currently used in the automotive industry. As will be seen in the details of protocol, by this simple HTA procedure catalysts can be ranked not only for the overall hydrothermal stability but also especially for the hydrothermal effect on catalyst "skin", i.e., the outer surface layer of beads or pellets, since most of the reactions take place on the outer layer of some 5 to 15 micron thickness. The hydrothermal effect include noble metal sintering, transition of alumina to alpha phase, interaction of noble metals with base metal ingredients of the support, including promoters, stabilizers, and the support itself. Furthermore, despite its simplicity, oversimplified in the sense that no poisoning aspect is reflected in the aging process, this HTA procedure can distinguish bead or pelleted catalysts with nearly optimal metals penetration profiles from those with undesirable metals penetration profiles. In this respect, this HTA procedure can usually approximate the utility of the conventional accelerated aging procedure, e.g., pulsator aging procedure.

In HTA, an 8.5 cc sample of fresh catalyst in a 2.6 cm I.D. inconel reactor is exposed for 4 hours to flowing nitrogen (at a rate of 1 liter total at STP/min.) containing 10% water vapor, 4% O₂, and 4% CO. Carbon monoxide was cycled at 0.1 Hz between two identical inconel reactors which were maintained at 982° C. wall when 4% CO stream was on. This means each catalyst sample is exposed to the feed stream which alternates between 4% O₂ for 5 seconds when CO was off and 2% O₂ for 5 seconds when CO was on. After 4-hour exposure to such an oscillating condition, the samples are cooled in the same feed stream to 150° C., and then the sample discharged to TWC performance evaluation.

TWC performance data on each of the above catalysts of Examples 1-9 are summarized in Table II. These data reveal, for a given level of H₂S getter loading, alumina-silica is a preferred base (cf. Example 9).

H₂S-gettering ingredients must be present at a reasonably high concentration within the outer layer of approximately 300 microns (cf. Examples 3 and 4).

Catalysts meeting the requirements for both TWC performance as well as H₂S gettering are those where the promoters for three-way conversion and H₂S gettering oxides have distributions which are optimized between the TWC promoting and H₂S gettering ingredients as illustrated in Example 6. These two types of materials are preferably within the outer layer of approximately 300 microns. It is believed that this region is of major significance because all of the reactions controlling the TWC efficiency as well as the efficiency of H₂S gettering take place on the catalyst surface, and that all those reactions are pore diffusion controlled under the operating conditions.

It is understood that the foregoing detailed description is given merely by way of illustration and that many variations may be made without departing from the spirit of this invention.

What is claimed is:

1. In a catalyst suitable for use as a catalyst for auto emission control characterized by an alumina support with components deposited thereon consisting essentially of lanthana as a stabilizer in an amount of about 1 to 10% by weight expressed as La₂O₃ which is either in the form of lanthana only or in the form of lanthana-rich rare earth oxides where the La₂O₃ is at least 50% by weight of the total rare earth oxides, 1-20% by weight of ceria as a promoter, at least 0.5 to about 5% by weight of an alkali metal oxide as a promoter, and a catalytically-effective amount of one or more platinum group metals, the improvement comprising adding H₂S gettering capability by having the catalyst further comprise (a) an H₂S gettering metal oxide selected from the group consisting of oxides of Ni, Fe and mixtures thereof in an amount from an H₂S gettering effective amount up to 10 weight %, provided that when the H₂S gettering metal oxide is just NiO, the maximum concentration of the NiO in the first 300 micron layer is at least about twice its average concentration throughout the support; and (b) wherein said alumina support can have additionally from 0 to 20% $SiO_2$ present.

2. A catalyst according to claim 1, wherein the H₂S gettering metal oxide is an oxide of Fe.

3. A catalyst according to claim 1, wherein the H₂S gettering metal oxide is an oxide of Ni.

4. A catalyst according to claim 1, wherein the $SiO_2$ is present in the alumina support from 0.1% to 20% by weight.

5. A catalyst according to claim 4, wherein the $SiO_2$ is present in the alumina support from 1% to 15% by weight.

6. A catalyst according to claim 5, wherein the H₂S gettering metal oxide is NiO.

7. A catalyst according to claim 1, wherein the alumina support is pelleted and said platinum group metals penetrate the alumina support to an average distance less than approximately 300 microns as measured by the $SnCl_2$ solution staining method, provided that when the platinum group metals are rich in palladium, the palladium may penetrate deeper than 300 microns.

8. A catalyst according to claim 1, wherein the alkali metal oxide is $Li_2O$.

9. A catalyst according to claim 1, wherein the lanthana expressed as $La_2O_3$ is about 2–6% by weight.

10. A catalyst according to claim 1, wherein the ceria is present from about 2 to 10 wt. % $CeO_2$ and the alkali metal oxide is present from 0.5 to 3 wt. % alkali metal oxide.

11. A catalyst according to claim 7, wherein the platinum group metals comprise at least platinum and rhodium.

12. A catalyst according to claim 1, wherein the alumina support is a washcoat powder.

13. A catalyst according to claim 8, wherein a maximum platinum concentration is within about 50 microns of the exterior surface of the support and no more than about 70% of the total platinum loaded is located within about 100 microns depth and a maximum rhodium concentration is within about 50 microns of the exterior surface of the support and no more than about 95% of the total rhodium loaded is located within about 100 microns depth.

14. A catalyst according to claim 1, wherein the alumina support is pelleted and said H₂S gettering metal oxide penetrates the alumina support to an average distance of approximately 600 microns and preferably no more than approximately 300 microns by visual measurement under microscope.

15. A catalyst according to claim 1, wherein the lanthana is initially deposited on the alumina support and thereafter the ceria, alkali metal oxide and one or more platinum group metals are deposited thereon.

16. A method of making a catalyst which is suitable for use for auto emission comprising the steps of
(a) impregnating an alumina support which has been heated to at least 300° C. with a solution containing a lanthanum salt which is either in the form of lanthanum-rich rare earth salts, which upon calcination gives rare earth oxides where $La_2O_3$ is at least 50% by weight of the total rare earth oxides;

(b) heating the impregnated support to at least decompose the lanthanum salt to obtain a lanthana impregnated support;

(c) applying promoters, an H₂S gettering metal oxide selected from the group consisting of NiO, $Fe_2O_3$ and mixtures thereof, and one or more platinum group metals by either
A.
 (1) impregnating the lanthana-impregnated alumina support from step (b) with a soluble cerium salt solution;
 (2) heating the impregnated support to at least decompose the cerium salt to obtain a lanthana-ceria impregnated support; and
 (3) impregnating the lanthana-ceria impregnated support with solutions bearing one or more platinum group metals, said H₂S gettering metal oxide, and at least one alkali metal; or
B.
 (1) impregnating the lanthana impregnated support from step (b) with a solution containing a soluble cerium salt and a lithium salt;
 (2) heating the impregnated support to at least decompose the cerium and lithium salts to obtain a lanthana-ceria-lithia impregnated support; and
 (3) impregnating the lanthana-ceria-lithia impregnated support with solutions bearing one or more platinum group metals and said H₂S gettering metal oxide to form a catalyst;
wherein when said H₂S gettering metal oxide is applied the application procedure is controlled to provide an amount from an H₂S gettering effective amount up to 10 weight % and in the event that the H₂S gettering metal oxide is just NiO, controlling the maximum concentration of the NiO in the first 300 micron layer so that it is at least about twice its average concentration throughout the support;

(d) air drying the catalyst at ambient temperature for 0–4 hours, and at about 100°–150° C. to dry the catalyst after each impregnation with solutions bearing catalytic metals; and (e) activating the catalyst, which has previously been heated to a temperature of at least 800°–1100° C. in one of the prior steps (b) or (c), at a temperature of about 250°–550° C.

17. A method according to claim 16, wherein $SiO_2$ is further present in the alumina support in an amount from 0.1% to 20% by weight.

18. A method according to claim 17, wherein the $SiO_2$ is present in the alumina support from 1% to 15% by weight.

19. A method according to claim 16, wherein when the H₂S gettering metal oxide is just NiO, the penetration depth of the NiO is controlled by subjecting the alumina support impregnated with the NiO to anhydrous ammonia gas.

20. A method according to claim 16, wherein the heating in step (b) is done at a temperature of from about 800 to 1100° C. to thermally stabilize the support.

21. A method according to claim 16, wherein the activation in step (e) is done in the presence of hydrogen.

22. A method according to claim 16, wherein the platinum group metals in step (cA3) or (cB3) are provided in the form of water soluble platinum group metal compounds which are selected from the group consisting of sulfito complexes of platinum group metals, chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexammine rhodium chloride, and hexammine iridium chloride.

23. A method according to claim 22, wherein the platinum group metals in step (cA3) or (cB3) are provided in the form of sulfito complexes.

24. A method according to claim 16, wherein the platinum group metals in step (cA3) or (cB3) include Rh and wherein at least a part of the Rh containing solution is impregnated separately from the other platinum group metal solutions.

25. A method according to claim 24, wherein the Rh containing solution further contains a penetration aid.

26. A method according to claim 16, wherein the alkali metal in step (cA3) is lithium.

27. A method according to claim 16, wherein the solutions of cerium salt and lithium salt are applied in step (cB1) either (a) by first a cerium salt followed by a lithium salt, (b) by first a lithium salt followed by cerium salt or (c) by a simultaneous application of a mixture of the cerium salt and the lithium salt.

28. A method according to claim 16, wherein the activation in step (e) is done in the presence of steam and at a temperature of 550°–650° C.

29. A method according to claim 16, wherein the $H_2S$ gettering metal oxide is an oxide of Fe.

30. A method according to claim 16, wherein the $H_2S$ gettering metal oxide is an oxide of Ni.

31. A method according to claim 16, wherein the concentration of the $H_2S$ gettering metal oxide is controlled in the first 300 micron layer so that the maximum $H_2S$ gettering metal oxide concentration within that layer is at least about twice its average concentration throughout the support.

32. A method according to claim 31, wherein the penetration depth of the $H_2S$ gettering metal oxide is controlled by subjecting the alumina support impregnated with the $H_2S$ gettering metal oxide to anhydrous ammonia gas.

33. A catalyst made by the process of claim 16.

34. A catalyst made by the process of claim 23.

* * * * *

UNITED STATES PATENT AND TRADEMARK OFFICE
CERTIFICATE OF CORRECTION

PATENT NO. : 4,780,447
DATED : October 25, 1988
INVENTOR(S) : Gwan Kim, Michael V. Ernest, Stanislaw Plecha It is certified that error appears in the above-identified patent and that said Letters Patent is hereby corrected as shown below:

In Table II at the top of columns 15 and 16 correct the entry for Example 4 to read:

TABLE II
HTA and $H_2S$ Results on Catalysts

| Example | Base | Extra BM Wt.% | % Conversion Attained at R* Values of Rich ← 0.75 | | | 0.85 | | | 1.0 | | | 1.15 | | | → Lean 1.5 | | | CO/NO | ppm $H_2S$ Obs. in Tests 1st | 4th |
|---|---|---|---|---|---|---|---|---|---|---|---|---|---|---|---|---|---|---|---|---|
| | | | HC | CO | NO | HC | CO | NO | HC | CO | NO | HC | CO | NO | HC | CO | NO | | | |
| 4 | Alumina | 1.17% NiO 0.53% $K_2O$ | 52 | 61 | 80 | 68 | 70 | 87 | 83 | 84 | 91 | 87 | 94 | 84 | 85 | 96 | 63 | 89 | 40 | |

Signed and Sealed this

Twenty-sixth Day of November, 1991

Attest:

HARRY F. MANBECK, JR.

Attesting Officer        Commissioner of Patents and Trademarks